United States Patent
Li et al.

(10) Patent No.: US 8,009,886 B2
(45) Date of Patent: Aug. 30, 2011

(54) SYSTEM AND METHOD FOR IMAGE REGISTRATION

(75) Inventors: Shou Li, Ontario (CA); Prakash Mahesh, Hoffman Estates, IL (US); Dave Roeder, Toronto (CA); Greg Garvin, London (CA)

(73) Assignee: General Electric Company, Schenectady, NY (US)

( * ) Notice: Subject to any disclaimer, the term of this patent is extended or adjusted under 35 U.S.C. 154(b) by 910 days.

(21) Appl. No.: 11/969,001

(22) Filed: Jan. 3, 2008

(65) Prior Publication Data
US 2009/0175522 A1    Jul. 9, 2009

(51) Int. Cl.
*G06K 9/00*     (2006.01)
*A61B 6/00*     (2006.01)

(52) U.S. Cl. ............................ 382/128; 382/294; 378/20

(58) Field of Classification Search ................. 382/128, 382/129, 130, 131, 132, 133, 134, 151, 154, 382/155, 168, 173, 181, 199, 232, 254, 260, 382/274, 275, 276, 294, 305, 312, 226, 176; 378/4, 20, 21
See application file for complete search history.

(56) References Cited

U.S. PATENT DOCUMENTS

| 6,744,923 | B1 * | 6/2004 | Zabih et al. ................... 382/226 |
| 6,973,212 | B2 | 12/2005 | Boykov et al. |
| 6,973,213 | B2 * | 12/2005 | Fan et al. ....................... 382/176 |
| 7,634,123 | B2 * | 12/2009 | Florin et al. ................... 382/128 |

OTHER PUBLICATIONS

Boykov, Y., Veksler, O., Zabih, R., Fast approximate energy minimization via graph cuts,IEEE Transaction on Pattern Analysis and Machine Intelligence (PAMI) 23 (11 ) (Nov. 2001) 1222-1239.*
Kolmogorov, V., Zabih, R., What energy functions can be minimized via graph cuts?, IEEE Transaction on Pattern Analysis and Machine Intelligence (PAMI) 26 (2) (Feb. 2004) 147-159.*

* cited by examiner

*Primary Examiner* — Seyed Azarian
(74) *Attorney, Agent, or Firm* — McAndrews, Held & Malloy, Ltd.; Michael A. Dellapenna

(57) ABSTRACT

Certain embodiments of the present invention provide for a system and method for performing medical image registration. Pixel and voxel correspondences are formulated as energy minimization problems and are optimized with graph cuts. The method includes processing a first set of data and a second set of data using a graph cuts algorithm to determine a minimum value of an energy function. The energy function has a data term and a smoothness term. The method also includes performing registration for the first set of data and the second set of data based on the data term and the smoothness term of the energy function. The system includes a computer system for performing medical image registration. The computer system comprises a processor and a memory in communication with the processor. The memory includes program code executable by the processor for executing a medical image registration algorithm.

20 Claims, 4 Drawing Sheets

↑ 310   ↑ 320   ↑ 330   ↑ 340   ↑ 350

SYSTEM AND METHOD FOR IMAGE REGISTRATION

BACKGROUND OF THE INVENTION

The present invention generally relates to a system and method for improved image registration for medial image analysis. Particularly, the present invention relates to a system and method for image registration using graph cuts algorithm to determine the minimum value of an energy function.

Medical diagnostic imaging systems encompass a variety of imaging modalities, such as x-ray systems, computerized tomography (CT) systems, ultrasound systems, electron beam tomography (EBT) systems, magnetic resonance (MR) systems, and the like. Medical diagnostic imaging systems generate images of an object, such as a patient, for example, through exposure to an energy source, such as x-rays passing through a patient, for example. The generated images may be used for many purposes. One example is medical diagnosis from 2-D and 3-D MR or CT images used by a doctor to investigate various organs of patients, including internal defects. Four-dimensional medical images containing information about 3-D volumes moving in time are also currently available. By comparing images over time, changes in internal structure or alignment may be determined. Fluid flow within an object may also be represented. The information gained from medical diagnostic imaging has applications in many fields, including medicine and manufacturing.

An example of a medical diagnostic imaging system is Picture Archival Communication Systems (PACS). PACS is a term for equipment and software that permits images, such as x-rays, ultrasound, CT, MRI, EBT, MR, or nuclear medicine for example, to be electronically acquired, stored and transmitted for viewing. Medical images from an exam may be viewed immediately, stored, or transmitted. The medical images may be viewed on diagnostic workstations, by users, for example radiologists. In addition to viewing the images, the user may also view patient information associated with the image, for example the name of the patient or the patient's sex.

Medical images, usually of substantially the same structure, may be acquired at different points in time. For example, a first set of medical images of a structure and a subsequent second set of medical images of the same structure may be acquired. The first set of images may be combined with the second set of images to create a composite medical image. Typically, the process of creating a composite medical image may be described as medical image registration. Medical image registration is a visualization tool that can significantly aid in the early detection of tumors and other diseases, and aid in improving the accuracy of diagnosis. For example, the medical image registration may illustrate information not apparent in the separate images. Medical image registration has been applied to the diagnosis of breast cancer, colon cancer, cardiac studies, wrist and other injuries, inflammatory diseases and different neurological disorders including brain tumors, Alzheimer's disease and schizophrenia.

Various medical image registration techniques are currently employed. However, current medical image registration techniques are typically time consuming. As a result, the time of a health care professional may not be used in an efficient manner. Additionally, current medical image registration techniques are typically inaccurate. The inaccurateness creates reliability problems for doctors and creates difficulty in determining an accurate diagnosis. Also, current medical image registration techniques are typically not robust. In general, current medical image registration techniques are sensitive to noise and initial conditions. The lack of robustness increases the rate of inaccuracies.

SUMMARY OF THE INVENTION

Certain embodiments of the present invention provide a system and method for performing medical image registration. The method includes processing a first set of data and a second set of data using a graph cuts algorithm to determine a minimum value of an energy function. The energy function has a data term and a smoothness term. The method also includes performing registration for the first set of data and the second set of data based on the data term and the smoothness term of the energy function. The system includes a computer system for performing medical image registration. The computer system comprises a processor and a memory in communication with the processor. The memory includes program code executable by the processor for executing a medical image registration algorithm. The medical image registration algorithm includes processing a first set of data and a second set of data using a graph cuts algorithm to determine a minimum value of an energy function. The energy function has a data term and a smoothness term. Certain embodiments of the present invention also include a computer—readable storage medium including a set of instructions for a computer. The set of instructions include a processing routine for processing a first set of data and a second set of data using a graph cuts algorithm to determine a minimum value of an energy function. The energy function has a data term and a smoothness term. The set of instructions also includes a registration routine for performing registration for the first set of data and the second set of data based on the data term and the smoothness term of the energy function.

DETAILED DESCRIPTION OF THE INVENTION

Figure 1:
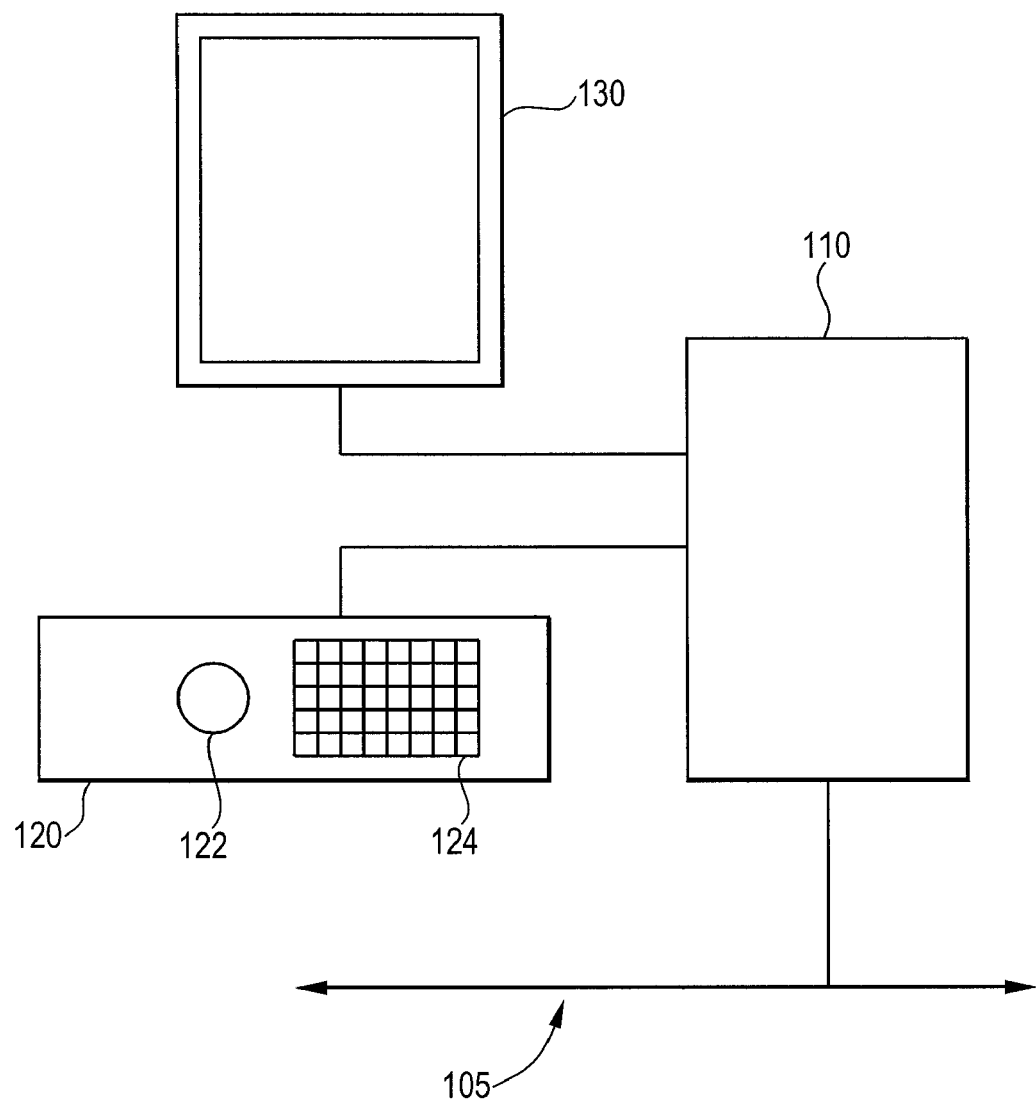
FIG. 1 illustrates an example of a system that may be used in accordance with an embodiment of the present invention.

FIG. 1 illustrates a system 100 for acquiring, manipulating, and/or viewing medical images. The system 100 includes a computer unit 110. The computer unit 110 may be any equipment or software that permits electronic medical images, such as x-rays, ultrasound, CT, MRI, gated MRI, EBT, MR, or nuclear medicine for example, to be electronically acquired, stored, or transmitted for viewing and operation. The computer unit 110 may have at least one processor and memory. The computer unit may receive input from a user. The computer unit 110 may be connected to other devices as part of an electronic network. In FIG. 1, the connection to the network is represented by line 105. The computer unit 110 may be connected to network 105 physically, by a wire, or through a wireless medium. In an embodiment, the computer unit 110 may be, or may be part of, a picture archival communication system (PACS).

The system 100 also includes an input unit 120. The input unit 120 may be a console having a track ball 122 and keyboard 124. Other input devices may be used to receive input from a user as part of the input unit 120. For example a microphone may be used to receive verbal input from a user. The system 100 also includes at least one display unit 130. The display unit 130 may be a typical computer display unit. The display unit 130 may be in electrical communication with the computer unit 110 and input unit 120. In an embodiment, the display unit 130 may represent multiple display units or display regions of a screen. Accordingly, any number of display units may be utilized in accordance with the present invention.

In an embodiment, the system 100 is a PACS with display unit 130 representing the display unit of PACS. The computer unit 110 may represent equipment and components of a PACS system other than the display unit. The computer unit 110 and display unit 130 may be separate units or be part of a single unit. In the case of separate units, the display unit 130 may be in electrical communication with the computer unit 110. The components of the system 100 may be single units, separate units, may be integrated in various forms, and may be implemented in hardware and/or in software.

In an embodiment, the computer unit 110 may be connected to a medical diagnostic imaging system by the network 105. In an embodiment, the medical diagnostic imaging system may include, for example, an x-ray system, a computerized tomography (CT) system, an ultrasound system, an electron beam tomography (EBT) system, or a magnetic resonance (MR) system.

Figure 2:
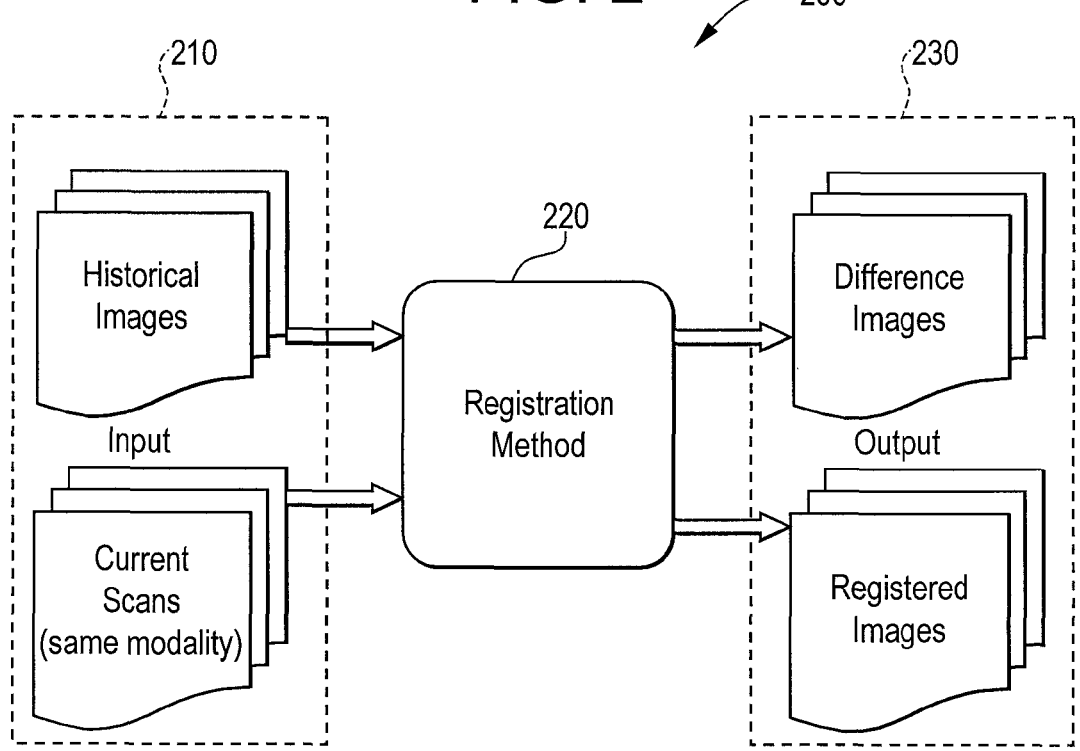
FIG. 2 illustrates a workflow that may be used in accordance with an embodiment of the present invention.

In an embodiment, the computer unit 110 may include computer software to perform medical image registration. The medical image registration discussed herein is single modality registration. FIG. 2 illustrates a work flow 200 of computer software that may be used to perform registration of medical images in accordance with an embodiment of the present invention. In FIG. 2, the elements of 210 represent input into the registration algorithm 220. The input elements 210 may include, but are not limited to, historical images or scans, current images or scans, nodes, edges, penalty functions, and assumptions. The output elements of registration algorithm 220 may include difference images or registered images, among other potential outputs.

The medical image registration algorithm 220 treats the pixel correspondences as image labeling problems. The medical image registration algorithm 220 utilizes energy minimization functions to find solutions that are smooth over the surface of objects in a view but also preserve sharp discontinuities at the boundaries, for example. The medical image registration algorithm 220 uses graph cuts algorithm to obtain solutions. For example, the graph cuts algorithm is a solution to the minimum cut problem. For example, the minimum cut problem includes finding the cut with smallest cost. A graph can be thought of as a net and on the net are nodes and strings that connect the nodes. In a preferred embodiment of the present invention, nodes are connected to neighboring nodes immediately above, below, to the right and to the left. The lines connecting the nodes represent the relationship between the nodes. In graph terminology, these lines are also referred to as "edges". Each line belongs to a distinct pair of pixels. Many types of graph cuts algorithms are possible and this invention is not limited to graph cuts algorithms described herein. The use of energy minimization and graph cuts algorithm is more fully described in the papers: Boykov, Y, Veksler, O., Zabih, R.: Fast approximate energy minimization via graph cuts, IEEE Transaction on Pattern Analysis and Machine Intelligence (PAMI) 23(11) (November 2001) 1222-1239; Kolmogorov, V., Zabih, R.: What energy functions can be minimized via graph cuts? IEEE Transaction on Pattern Analysis and Machine Intelligence (PAMI) 26(2) (February 2004) 147-159; and U.S. Pat. No. 6,744,923; the full text of each is herein incorporated by reference.

In an embodiment, the medical image registration algorithm 220 may be described as follows. If we let I and I' be the N-dimensional source and target images or image volumes respectively, $\Pi$ be the set of pixels in one image, $I_p$ and $I'_p$ be the corresponding intensities of pixel p in image I and I' respectively. If we let $\xi$ be a finite set of N-dimension labels as set forth in the following equation:

$$\xi = \{(l_1^{n=1}, l_1^{n=2}, l_1^{n=3} \ldots n_1^{n=N}), (l_1^{n=1}, l_1^{n=2}, l_1^{n3} \ldots l_1^{n=N}, \ldots)\} \quad (1)$$

representing the pixel disparities in N-dimensional directions and $f_p$ be a label assigned for a pixel $p(p \in \Pi, f_p \in \xi)$. If we let $f = \{f_p | p \in \xi\}$, we can use the graph cuts algorithm proposed in Boykov, Y., Veksler, O., Zabih, R.: Fast approximate energy minimization via graph cuts, IEEE Transaction on Pattern Analysis and Machine Intelligence (PAMI) 23(11) (November 2001) 1222-1239, which is herein fully incorporated by reference, to minimize the following energy function:

$$E(f) = \lambda \sum_{p \in P} D_p(f_p) + \sum_{(p,q) \in N} V_{p,q}(f_p, f_q). \quad (2)$$

The term $D_p(f_p)$ represents the data term. The data term specifies the penalty for pixel p to be labeled as $f_p$. The term $V_{p,q}(f_p, f_q)$ represents the smoothness term and represents how pixels react within a pair of pixels. The term $V_{p,q}(f_p, f_q)$ may also be thought of as a penalty for discontinuity between pixels, for example neighbor pixels p and q to be labeled as $f_p$ and $f_q$. The term N is the set of interacting pairs of pixels. Typically N consists of adjacent pixels, but it can be arbitrary.

Once the energy function of equation (2) has been minimized, the medical image registration algorithm 220 may perform registration. The registration may be described as follows:

$$D_p(f_p) = C(p, f_p)^2, \quad (3)$$

$$C(p, f_p) = \min\{C_{fwd}(p, f_p), C_{rev}(p, f_p)\},$$

$$C_{fwd}(p, f_p) = \min_{f_p - \frac{1}{2} \leq x,y,z,\ldots \leq f_p + \frac{1}{2}} |I_p - I'_{p+(x,y,z\ldots)}|,$$

$$C_{rev}(p, f_p) = \min_{p - \frac{1}{2} \leq x,y,z,\ldots \leq p + \frac{1}{2}} |I_{(x,y,z,\ldots)} - I'_{p+f_p}|.$$

where x,y,z . . . represents the N-dimensional coordinates. Through using $C_{fwd}(p, f_p)$ and $C_{rev}(p, f_p)$, the modeling is robust to image sampling. The smoothness term $V_{p,q}(f_p, f_q)$ may be defined as follows:

$$V_{p,q}(f_p, f_q) = K^* \min(\text{constr}, \|f_p - f_q\|^2), \quad (4)$$

where $f_p$ and $f_q$ are the N-dimensional labels for pixels p and q, respectively. $\|\cdot\|$ is the 2-norm distance function. In an embodiment, the registration performed by the medical image registration algorithm 220 may include temporal registration.

In an embodiment, the energy minimization of equations (2), (3), and (4) is achieved by the following $\alpha$–$\beta$ swap algorithm:

```
Algorithm 1 (α – β swap algorithm)

1. Start: an arbitrary labeling f
2. Set: success = 0
3. for each pair of labels {α, β ∈ ξ} do
        Find f̂ = arg min E(f') among f' within one α – β swap of
        f
        if E(f̂) < E(f') set f := f̂ and success = 1
4. end for
5. If success = 1 goto 2
6. Return f
``` which is fully described in Boykov, Y, Veksler, O., Zabih, R.: Fast approximate energy minimization via graph cuts, IEEE Transaction on Pattern Analysis and Machine Intelligence (PAMI) 23(11) (November 2001) 1222-1239, which is herein fully incorporated by reference.

The medical image registration algorithm 220 models image deformations as piecewise smooth, which encourages the spatial consistency between neighboring pixels or voxels as well as preserving sharp discontinuities at object boundaries. Without losing generality, the term pixel is used to represent both pixels and voxels herein. The described framework provides for a true free-form transformation as, in an embodiment, every single pixel has its own transformation. Also, in general, the technique is reliable and robust and provides a local minimum.

Figure 3:
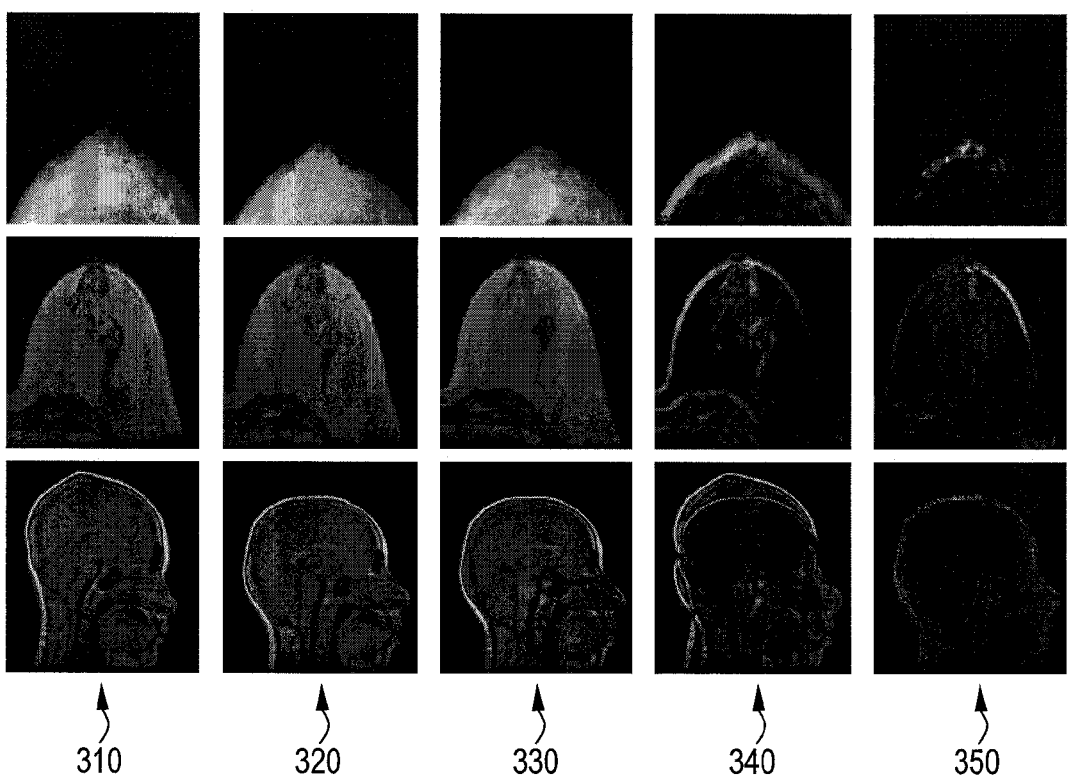
FIG. 3 illustrates an example of a graphic in accordance with an embodiment of the present invention.

FIG. 3 illustrates an example of graphic 300 showing the results of the medical image registration algorithm 220 in accordance with an embodiment of the present invention. The first row illustrates mammogram images, the second row illustrates MRI breast images and the third row illustrates brain images. The first column 310 illustrates the source images. The second column 320 illustrates the registered images. The third column 330 illustrates the target images. The fourth column 340 illustrates the absolute difference before registration. The fifth column 350 illustrates the absolute difference after registration. In an embodiment, a health care professional may utilize the images 310-350 to aid in diagnosis and treatment. For example a health care professional may utilize the various images to diagnose and treat cancer or other diseases.

Figure 4:
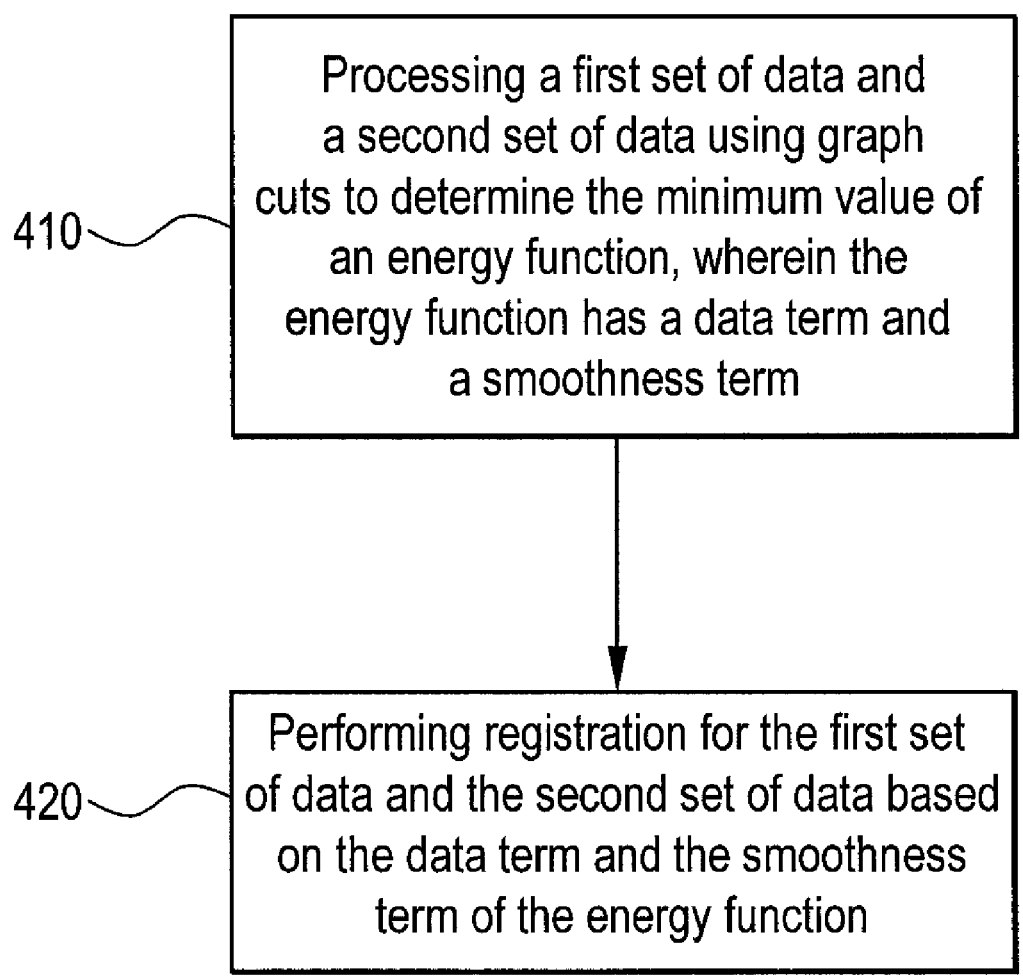
FIG. 4 illustrates a method that may be used in accordance with an embodiment of the present invention.

FIG. 4 illustrates a method 400 for registering medical images in accordance with an embodiment of the present invention. At step 410, a first set of data and a second set of data is processed using graph cuts algorithm to determine the minimum value of an energy function. In an embodiment, the energy function has a data term and a smoothness term. In an embodiment, if we let I and I' be the N-dimensional source and target images or image volumes respectively, Π be the set of pixels in one image, $I_p$ and $I'_p$ be the corresponding intensities of pixel p in image I and I' respectively. If we let ξ be a finite set of N-dimension labels as set forth in the following equation:

$$\xi = \{(l_1^{n=1}, l_1^{n=2}, l_1^{n=3} \ldots l_1^{n=N}), (l_1^{n=1}, l_1^{n=2}, l_1^{n=3} \ldots l_1^{n=N}, \ldots)\} \quad (1)$$

representing the pixel disparities in N-dimensional directions and $f_p$ be a label assigned for a pixel p(p ∈ Π, $f_p$ ∈ ξ). If we let f={$f_p$ | p ∈ ξ}, we can use the graph cuts algorithm proposed in Boykov, Y., Veksler, O., Zabih, R.: Fast approximate energy minimization via graph cuts, IEEE Transaction on Pattern Analysis and Machine Intelligence (PAMI) 23(11) (November 2001) 1222-1239, which is herein fully incorporated by reference, to minimize the following energy function:

$$E(f) = \lambda \sum_{p \in P} D_p(f_p) + \sum_{(p,q) \in N} V_{p,q}(f_p, f_q). \quad (2)$$

The term $D_p(f_p)$ represents the data term. The data term specifies the penalty for pixel p to be labeled as $f_p$. The term $V_{p,q}(f_p,f_q)$ represents the smoothness term and represents how pixels react within a pair of pixels. The term $V_{p,q}(f_p, f_q)$ may also be thought of as a penalty for discontinuity between pixels, for example neighbor pixels p and q to be labeled as $f_p$ and $f_q$. The term N is the set of interacting pairs of pixels. Typically N consists of adjacent pixels, but it can be arbitrary.

At step 420, registration is performed for the first set of data and the second set of data based on the data term and the smoothness term of the energy function. In an embodiment, the registration may be described as follows:

$$D_p(f_p) = C(p, f_p)^2, \quad (3)$$

$$C(p, f_p) = \min\{C_{fwd}(p, f_p), C_{rev}(p, f_p)\},$$

$$C_{fwd}(p, f_p) = \min_{f_p - \frac{1}{2} \leq x, y, z, \ldots \leq f_p + \frac{1}{2}} |I_p - I'_{p+(x,y,z\ldots)}|,$$

$$C_{rev}(p, f_p) = \min_{p - \frac{1}{2} \leq x, y, z, \ldots \leq p + \frac{1}{2}} |I_{(x,y,z,\ldots)} - I'_{p+f_p}|.$$

where x, y, z . . . represents the N-dimensional coordinates. Through using $C_{fwd}(p, f_p)$ and $C_{rev}(p, f_p)$, the modeling is robust to image sampling. The smoothness term $V_{p,q}(f_p, f_q)$ may be defined as follows:

$$V_{p,q}(f_p, f_q) = K \cdot \min(\text{constr}, \|f_p - f_q\|^2), \quad (4)$$

where $f_p$ and $f_q$ are the N-dimensional labels for pixels p and q, respectively. ‖·‖ is the 2-norm distance function. In an embodiment, the registration performed may include temporal registration.

In an embodiment, the energy minimization of equations (2), (3), and (4) is achieved by the following α–β swap algorithm:

```
Algorithm 1 (α – β swap algorithm)

1. Start: an arbitrary labeling f
2. Set: success = 0
3. for each pair of labels {α, β ∈ ξ} do
        Find f̂ = arg min E(f') among f' within one α – β swap of
        f
        if E(f̂) < E(f') set f := f̂ and success = 1
4. end for
5. If success = 1 goto 2
6. Return f
``` which is fully described in Boykov, Y, Veksler, O., Zabih, R.: Fast approximate energy minimization via graph cuts, IEEE Transaction on Pattern Analysis and Machine Intelligence (PAMI) 23(11) (November 2001) 1222-1239, which is herein fully incorporated by reference.

The system and methods described above may be carried out as part of a computer-readable storage medium including a set of instructions for a computer. The set of instructions may include a processing routine for processing a first set of data and a second set of data using graph cuts algorithm to determine the minimum value of an energy function, wherein said energy function has a data term and a smoothness term. In an embodiment, the energy function has a data term and a smoothness term. In an embodiment, if we let I and I' be the N-dimensional source and target images or image volumes respectively, $\Pi$ be the set of pixels in one image, $I_p$ and $I'_p$ be the corresponding intensities of pixel p in image I and I' respectively. If we let $\xi$ be a finite set of N-dimension labels as set forth in the following equation:

$$\xi = \{(l_1^{n=1}, l_1^{n=2}, l_1^{n=3} \ldots l_1^{n=N}), (l_1^{n=1}, l_1^{n=2}, l_1^{n=3} \ldots l_1^{n=N}, \ldots)\} \quad (1)$$

representing the pixel disparities in N-dimensional directions and $f_p$ be a label assigned for a pixel $p(p \in \Pi, f_p \in \xi)$. If we let $f = \{f_p \mid p \in \xi\}$, we can use the graph cuts algorithm proposed in Boykov, Y, Veksler, O., Zabih, R.: Fast approximate energy minimization via graph cuts, IEEE Transaction on Pattern Analysis and Machine Intelligence (PAMI) 23(11) (November 2001) 1222-1239, which is herein fully incorporated by reference, to minimize the following energy function:

$$E(f) = \lambda \sum_{p \in P} D_p(f_p) + \sum_{(p,q) \in N} V_{p,q}(f_p, f_q). \quad (2)$$

The term $D_p(f_p)$ represents the data term. The data term specifies the penalty for pixel p to be labeled as $f_p$. The term $V_{p,q}(f_p,f_q)$ represents the smoothness term and represents how pixels react within a pair of pixels. The term $V_{p,q}(f_p, f_q)$ may also be thought of as a penalty for discontinuity between pixels, for example neighbor pixels p and q to be labeled as $f_p$ and $f_q$. The term N is the set of interacting pairs of pixels. Typically N consists of adjacent pixels, but it can be arbitrary.

The set of instructions may also include a registration routine for performing registration for said first set of data and said second set of data based on said data term and said smoothness term of said energy function.

In an embodiment, the registration may be described as follows:

$$D_p(f_p) = C(p, f_p)^2, \quad (3)$$

$$C(p, f_p) = \min\{C_{fwd}(p, f_p), C_{rev}(p, f_p)\},$$

$$C_{fwd}(p, f_p) = \min_{f_p - \frac{1}{2} \leq x,y,z,\ldots \leq f_p + \frac{1}{2}} |I_p - I'_{p+(x,y,z\ldots)}|,$$

$$C_{rev}(p, f_p) = \min_{p - \frac{1}{2} \leq x,y,z,\ldots \leq p + \frac{1}{2}} |I_{(x,y,z\ldots)} - I'_{p+f_p}|.$$

where x, y, z ... represents the N-dimensional coordinates. Through using $C_{fwd}(p, f_p)$ and $C_{rev}(p, f_p)$, the modeling is robust to image sampling. The smoothness term $V_{p,q}(f_p, f_q)$ may be defined as follows:

$$V_{p,q}(f_p, f_q) = K \cdot \min(\text{constr}, \|f_p - f_q\|^2), \quad (4)$$

where $f_p$ and $f_q$ are the N-dimensional labels for pixels p and q, respectively. $\|\cdot\|$ is the 2-norm distance function. In an embodiment, the registration performed may include temporal registration.

In an embodiment, the energy minimization of equations (2), (3), and (4) is achieved by the following $\alpha$–$\beta$ swap algorithm:

---

Algorithm 1 ($\alpha$ – $\beta$ swap algorithm)

1. Start: an arbitrary labeling $f$
2. Set: success = 0

---

Algorithm 1 ($\alpha$ – $\beta$ swap algorithm)

2. for each pair of labels $\{\alpha, \beta \in \xi\}$ do
    Find $\hat{f} = \arg\min E(f')$ among $f'$ within one $\alpha$ – $\beta$ swap of $f$
    if $E(\hat{f}) < E(f')$ set $f := \hat{f}$ and success = 1
7. end for
8. If success = 1 goto 2
3. Return f

--- which is fully described in Boykov, Y, Veksler, O., Zabih, R.: Fast approximate energy minimization via graph cuts, IEEE Transaction on Pattern Analysis and Machine Intelligence (PAMI) 23(11) (November 2001) 1222-1239, which is herein fully incorporated by reference.

The technical effect of the invention is to perform registration of medical images. In an embodiment of the present invention, the technical effect may be achieved by processing a first set of data and a second set of data using graph cuts algorithm to determine the minimum value of an energy function, wherein the energy function has a data term and a smoothness term and performing registration for the first set of data and the second set of data based on the data term and the smoothness term of the energy function.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for performing medical image registration, said method comprising:

performing by one or more processing devices, at least:

processing a first set of data and a second set of data using a graph cuts algorithm to determine a minimum value of an energy function, wherein said energy function has a data term and a smoothness term, performing registration for said first set of data and said second set of data based on said data term and said smoothness term of said energy function.

2. The method of claim 1, wherein said graph cuts algorithm includes the following data assignments:

I is the N-dimensional source images or image volumes, I' is the N-dimensional target images or image volumes, $\Pi$ is the set of pixels in one image, $I_p$ is the corresponding intensity of pixel p in image I, $I'_p$ is the corresponding intensity of pixel p in image I', $\xi$ is a finite set of N-dimension labels as set forth in the following equation:

$$\xi = \{(l_1^{n=1}, l_1^{n=2}, l_1^{n=3} \ldots l_1^{n=N}), (l_1^{n=1}, l_1^{n=2}, l_1^{n=3} \ldots l_1^{n=N}, \ldots)\}$$

representing the pixel disparities in N-dimensional directions, $f_p$ is a label assigned for a pixel $p(p \in \Pi, f_p \in \xi)$, and $f = \{f_p \mid p \in \xi\}$.

3. The method of claim 2, wherein said energy function is the following:

$$E(f) = \lambda \sum_{p \in P} D_p(f_p) + \sum_{(p,q) \in N} V_{p,q}(f_p, f_q),$$

wherein E(f) represents the energy function, λ represents a constant $D_p(f_p)$ represents the data term, and $V_{p,q}(f_p, f_q)$ represents the smoothness term.

4. The method of claim 3, wherein said data term is the following:

$$D_p(f_p) = C(p, f_p)^2,$$

$$C(p, f_p) = \min\{C_{fwd}(p, f_p), C_{rev}(p, f_p)\},$$

$$C_{fwd}(p, f_p) = \min_{f_p - \frac{1}{2} \leq x,y,z,\ldots \leq f_p + \frac{1}{2}} |I_p - I'_{p+(x,y,z\ldots)}|,$$

$$C_{rev}(p, f_p) = \min_{p - \frac{1}{2} \leq x,y,z,\ldots \leq p + \frac{1}{2}} |I_{(x,y,z\ldots)} - I'_{p+f_p}|,$$

wherein x, y, z . . . represent the N-dimensional coordinates.

5. The method of claim 3, wherein said smoothness term is the following:

$$V_{p,q}(f_p, f_q) = K \cdot \min(\text{constr}, \|f_p - f_q\|^2),$$

wherein K represents a constant, where $f_p$ and $f_q$ are the N-dimensional labels for pixels p and q, respectively, $\|\cdot\|$ is the 2-norm distance function.

6. The method of claim 3, wherein the minimum value of said energy function is determined by the following α–β swap algorithm:

| Algorithm 1 (α – β swap algorithm) |
| --- |
| 1. Start: an arbitrary labeling f |
| 2. Set: success = 0 |
| 3. for each pair of labels {α, β ∈ ξ} do |
|     Find f̂ = arg min E(f') among f' within one α – β swap of f |
|     if E(f̂) < E(f) set f := f̂ and success = 1 |
| 4. end for |
| 5. If success = 1 goto 2 |
| 6. Return f. |

7. The method of claim 1, wherein said registration is temporal registration.

8. A computer system for performing medical image registration, the computer system comprising:
a processor;
a memory in communication with said processor, said memory including program code executable by the processor for executing a medical image registration algorithm, said medical image registration algorithm includes processing a first set of data and a second set of data using a graph cuts algorithm to determine a minimum value of an energy function, wherein said energy function has a data term and a smoothness term.

9. The system of claim 8, wherein said graph cuts algorithm includes the following data assignments:
I is the N-dimensional source images or image volumes, I' is the N-dimensional target images or image volumes, Π is the set of pixels in one image, $I_p$ is the corresponding intensity of pixel p in image I, $I'_p$ is the corresponding intensity of pixel p in image I', ξ is a finite set of N-dimension labels as set forth in the following equation:

$$\xi = \{(l_1^{n=1}, l_1^{n=2}, l_1^{n=3} \ldots l_1^{n=N}), (l_1^{n=1}, l_1^{n=2}, l_1^{n=3} \ldots l_1^{n=N}, \ldots)\}$$

representing the pixel disparities in N-dimensional directions, $f_p$ is a label assigned for a pixel p(p∈Π, $f_p$∈ξ), and f={$f_p$|p∈ξ}.

10. The system of claim 9, wherein said energy function is the following:

$$E(f) = \lambda \sum_{p \in P} D_p(f_p) + \sum_{(p,q) \in N} V_{p,q}(f_p, f_q),$$

wherein E(f) represents the energy function, λ represents a constant $D_p(f_p)$ represents the data term, and $V_{p,q}(f_p, f_q)$ represents the smoothness term.

11. The system of claim 10, wherein said data term is the following:

$$D_p(f_p) = C(p, f_p)^2,$$

$$C(p, f_p) = \min\{C_{fwd}(p, f_p), C_{rev}(p, f_p)\},$$

$$C_{fwd}(p, f_p) = \min_{f_p - \frac{1}{2} \leq x,y,z,\ldots \leq f_p + \frac{1}{2}} |I_p - I'_{p+(x,y,z\ldots)}|,$$

$$C_{rev}(p, f_p) = \min_{p - \frac{1}{2} \leq x,y,z,\ldots \leq p + \frac{1}{2}} |I_{(x,y,z\ldots)} - I'_{p+f_p}|,$$

wherein x, y, z . . . represent the N-dimensional coordinates.

12. The system of claim 10, wherein said smoothness term is the following:

$$V_{p,q}(f_p, f_q) = K \cdot \min(\text{constr}, \|f_p - f_q\|^2),$$

wherein K represents a constant, where $f_p$ and $f_q$ are the N-dimensional labels for pixels p and q, respectively, $\|\cdot\|$ is the 2-norm distance function.

13. The system of claim 10, wherein the minimum value of said energy function is determined by the following α–β swap algorithm:

| Algorithm 1 (α – β swap algorithm) |
| --- |
| 1. Start: an arbitrary labeling f |
| 2. Set: success = 0 |
| 3. for each pair of labels {α, β ∈ ξ} do |
|     Find f̂ = arg min E(f') among f' within one α – β swap of f |
|     if E(f̂) < E(f) set f := f̂ and success = 1 |
| 4. end for |
| 5. If success = 1 goto 2 |
| 6. Return f. |

14. The system of claim 8, wherein said medical image registration algorithm models image deformations as piecewise smooth.

15. A computer-readable storage medium including a set of instructions for a computer, the set of instructions comprising:
a processing routine for processing a first set of data and a second set of data using a graph cuts algorithm to determine a minimum value of an energy function, wherein said energy function has a data term and a smoothness term,
a registration routine for performing registration for said first set of data and said second set of data based on said data term and said smoothness term of said energy function.

16. The computer readable medium of claim 15, wherein said graph cuts algorithm includes the following data assignments:
I is the N-dimensional source images or image volumes, I' is the N-dimensional target images or image volumes, Π is the set of pixels in one image, $I_p$ is the corresponding intensity of pixel p in image I, $I'_p$ is the corresponding intensity of pixel p in image I', ξ is a finite set of N-dimension labels as set forth in the following equation:

$$\xi = \{(l_1^{n=1}, l_1^{n=2}, l_1^{n=3} \ldots l_1^{n=N}), (l_1^{n=1}, l_1^{n=2}, l_1^{n=3} \ldots l_1^{n=N}), \ldots\}$$

representing the pixel disparities in N-dimensional directions, $f_p$ is a label assigned for a pixel p (p ∈ Π, $f_p$ ∈ ξ), and f = {$f_p$|p∈ξ}.

17. The computer readable medium of claim 16, wherein said energy function is the following:

$$E(f) = \lambda \sum_{p \in P} D_p(f_p) + \sum_{(p,q) \in N} V_{p,q}(f_p, f_q),$$

wherein E(f) represents the energy function, λ represents a constant $D_p(f_p)$ represents the data term, and $V_{p,q}(f_p, f_q)$ represents the smoothness term.

18. The computer readable medium of claim 17, wherein said data term is the following:

$$D_p(f_p) = C(p, f_p)^2,$$

$$C(p, f_p) = \min\{C_{fwd}(p, f_p), C_{rev}(p, f_p)\},$$

$$C_{fwd}(p, f_p) = \min_{f_p - \frac{1}{2} \leq x,y,z,\ldots \leq f_p + \frac{1}{2}} |I_p - I'_{p+(x,y,z\ldots)}|,$$

$$C_{rev}(p, f_p) = \min_{p - \frac{1}{2} \leq x,y,z,\ldots \leq p + \frac{1}{2}} |I_{(x,y,z,\ldots)} - I'_{p+f_p}|,$$

wherein x, y, z . . . represent the N-dimensional coordinates.

19. The computer readable medium of claim 17, wherein said smoothness term is the following:

$$V_{p,q}(f_p, f_q) = K \cdot \min(\text{constr}, \|f_p - f_q\|^2),$$

wherein K represents a constant, where $f_p$ and $f_q$ are the N-dimensional labels for pixels p and q, respectively, ‖·‖ is the 2-norm distance function.

20. The computer readable medium of claim 17, wherein the minimum value of said energy function is determined by the following α–β swap algorithm:

| Algorithm 1 (α – β swap algorithm) |
|---|
| 1. Start: an arbitrary labeling f |
| 2. Set: success = 0 |
| 3. for each pair of labels {α, β ∈ ξ} do |
|     Find f̂ = arg min E(f') among f' within one α – β swap of f |
|     if E(f̂) < E(f) set f := f̂ and success = 1 |
| 4. end for |
| 5. If success = 1 goto 2 |
| 6. Return f. |

* * * * *

UNITED STATES PATENT AND TRADEMARK OFFICE
CERTIFICATE OF CORRECTION

PATENT NO.         : 8,009,886 B2                         Page 1 of 1
APPLICATION NO.    : 11/969001
DATED              : August 30, 2011
INVENTOR(S)        : Shuo Li and Prakash Mahesh It is certified that error appears in the above-identified patent and that said Letters Patent is hereby corrected as shown below:

Title page: (75) "Inventors:" delete "Shou Li" and insert -- Shuo Li --.

Signed and Sealed this
Twenty-first Day of July, 2015

Michelle K. Lee
*Director of the United States Patent and Trademark Office*